US011202407B2

(12) United States Patent
Landgraf (10) Patent No.: US 11,202,407 B2
(45) Date of Patent: Dec. 21, 2021

(54) APPARATUS AND METHOD FOR REMOVING AQUATIC VEGETATION (71) Applicant: Scott Landgraf, Wayzata, MN (US)

(72) Inventor: Scott Landgraf, Wayzata, MN (US)

( * ) Notice: Subject to any disclaimer, the term of this patent is extended or adjusted under 35 U.S.C. 154(b) by 0 days.

(21) Appl. No.: 16/373,924

(22) Filed: Apr. 3, 2019

(65) Prior Publication Data
US 2020/0375109 A1    Dec. 3, 2020

Related U.S. Application Data (60) Provisional application No. 62/667,142, filed on May 4, 2018, provisional application No. 62/652,221, filed on Apr. 3, 2018.

(51) Int. Cl.
*A01D 44/00* (2006.01)
*A01D 1/14* (2006.01)
*A01D 1/08* (2006.01)

(52) U.S. Cl.
CPC ............... *A01D 44/00* (2013.01); *A01D 1/08* (2013.01); *A01D 1/14* (2013.01)

(58) Field of Classification Search
CPC ............. A01D 44/00; A01D 1/08; A01D 1/14
See application file for complete search history.

(56) References Cited

U.S. PATENT DOCUMENTS

| | | | |
|---|---|---|---|
| 895,847 A * | 8/1908 | Ditchfield | |
| 2,340,917 A * | 2/1944 | James | A01B 1/16 172/380 |
| 2,606,050 A * | 8/1952 | Morris | A01G 20/30 403/328 |
| 2,961,817 A * | 11/1960 | Mitchell | A01D 44/00 56/8 |
| 3,601,956 A * | 8/1971 | Akermanis | A01D 44/00 56/8 |
| 4,375,299 A | 3/1983 | Laven | |
| 4,852,337 A | 8/1989 | Peterson | |
| 5,079,905 A * | 1/1992 | Bergstrom | A01D 44/00 294/66.1 |
| 5,146,734 A * | 9/1992 | Smyczek | A01D 1/02 30/309 |
| 5,201,168 A | 4/1993 | Jenson | |
| 6,250,054 B1 * | 6/2001 | Kramer | A01D 44/00 294/50.6 |
| 6,748,728 B2 * | 6/2004 | Hay | A01D 7/00 56/400.21 |
| 7,832,105 B2 * | 11/2010 | Vogel | A01D 44/00 30/166.3 |
| 8,220,232 B1 | 7/2012 | Marvin | |
| 2012/0240543 A1 | 9/2012 | Andrews | |
| 2020/0375109 A1 * | 12/2020 | Landgraf | A01D 44/00 |

FOREIGN PATENT DOCUMENTS

FR    2 440 679    *  6/1980

* cited by examiner

*Primary Examiner* — Hwei-Siu C Payer
(74) *Attorney, Agent, or Firm* — Gottardo Law LLC (57) ABSTRACT This invention relates generally to the removal of aquatic vegetation from bodies of water. More specifically, the invention relates to an apparatus and method for the removal of such vegetation, the apparatus and method facilitating a cutting or uprooting of the vegetation within the water and the optional collection of it there-from.

19 Claims, 13 Drawing Sheets

APPARATUS AND METHOD FOR REMOVING AQUATIC VEGETATION

CROSS REFERENCE TO RELATED APPLICATIONS

This non-provisional patent application claims priority to U.S. Provisional Patent Application Ser. Nos. 62/667,142 and 62/652,221 having respective filing dates of May 4, 2018 and Apr. 3, 2018.

TECHNICAL FIELD OF THE INVENTION

This invention relates generally to the removal of aquatic vegetation from bodies of water. More specifically, the invention relates to an apparatus and method for cutting or uprooting such vegetation within the water and removing the vegetation there-from.

BACKGROUND OF THE INVENTION

Aquatic vegetation is problematic to many utilizing the shorelines of lakes, ponds and rivers. For example, aquatic vegetation is problematic to swimmers because of the undesirability of swimming or wading in vegetation-infested waters. Aquatic vegetation along shorelines is also problematic to boaters because the vegetation tends to fowl or become tangled in the propellers of their motor boats.

Various tools and methods are present in the prior art for removing problematic aquatic vegetation. However, numerous disadvantages are associated with these prior art tools and methods. For example, boat-mounted machinery exists for cutting and/or dragging aquatic vegetation from lakes, ponds and rivers. However, this machinery is typically both overly complicated and expensive, and thus ill-suited for recreational users simply looking to remove aquatic vegetation from the waters of their beach or dock.

As an alternative to complex and expensive boat-mounted machinery, prior art hand-operated rakes and cutting tools exist that are manually pushed or dragged through the water to uproot or sever the vegetation for removal there-from. However, the tines of prior art hand-operated rakes prematurely clog with vegetation to reduce its further vegetation-gripping effectiveness while the cutting tools do not adequately collect the cut vegetation for its removal from the water. Such prior art rakes and cutting tools are also difficult to use due to a tendency of these tools to undesirably bury themselves in the sand or silt of the water body's bottom during vegetation uprooting or cutting operations. Further difficulties occur in placing the rake or cutting tool or at a desired location within the body of water due to the tool's weight causing it to rapidly sink within the water.

Thus, what is needed is a simple and effective apparatus and method for removing aquatic vegetation from bodies of water that overcomes the foregoing disadvantages. The apparatus and method should uproot or cut the vegetation without prematurely clogging the apparatus itself. Also, the apparatus and method should uproot or sever the vegetation without the apparatus digging into in the sand or silt located at the water body's bottom. Furthermore, the apparatus and method should adequately collect the severed or uprooted vegetation for its removal from the water. Additionally, the apparatus should possess a buoyant property to prevent it from rapidly sinking within the water, thus aiding in its placement therein. The present invention satisfies these aforementioned needs while also providing numerous other advantages over the prior art.

SUMMARY OF THE INVENTION

This invention relates generally to the removal of aquatic vegetation from bodies of water. More specifically, the invention relates to an apparatus and method for the removal of such vegetation, the apparatus and method facilitating a cutting or uprooting of the vegetation within the water and the optional collection of it there-from.

In a first embodiment, the apparatus comprises an elongated handle defining forward and rearward ends. A widthwise head is connected about transversely to the handle at the handle's forward end. The head preferably comprises a bracket having a plate connected to its underside, with the plate preferably defining a flat lower surface. The head defines outer ends and a middle portion. The forward end of the handle is connected centrally to the middle portion of the head via a head segment defined by the bracket. The elongated handle is preferably removably connected to the head via the head segment and is length adjustable via an assembly of a plurality of handle segments and linking segments.

The plate of the head defines a substantially flat lower surface defined between a removal edge and at least a holding edge. The removal edge cuts or uproots the aquatic vegetation when the head is moved in a forward direction while the holding edge at least holds the aquatic vegetation, cut or uprooted by the removal edge, when the head is moved in a rearward direction. The lower surface of the plate is oriented at a predetermined angle from the elongated handle to allow the plate's lower surface to remain flush against a lake, pond or river bottom while the handle is gripped above the water by a user. The removal edge defines an upwardly-directed angular offset segment for preventing an interference of the edge with water body's bottom surface when the head is moved in a forward direction.

The removal edge preferably comprises a plurality of rounded serrations and the holding edge preferably comprising a plurality of pointed serrations, with each serration defining an inwardly directed void. When the head moves in a forward direction, the rounded serrations "funnel" or direct one or more plants of the aquatic vegetation to the voids, which in turn sever or uproot such one or more plants. When the head moves in a rearward direction, the pointed serrations collect the one or more plants cut or uprooted by the head's removal edge. Although not as effective as those voids defined in the removal edge, the inwardly directed rearward voids of the holding edge can also cut and uproot vegetation when the head is moved in a rearward direction.

The outer ends of the head are preferably located rearward of the head's middle portion to define a collection area of the head between the outer ends. The collection area of the head, when moved in a rearward direction, gathers and collects the vegetation cut or uprooted by the removal edge during the head's movement in the forward direction. The outer ends of the head are also angled upwardly of the head's lower flat surface for preventing an interference of the outer ends with the bottom of a water body when the head is moved in a rearward direction. In another embodiment of the invention, the head possesses a buoyant property for countering a sinking motion of the head within the water to facilitate an easier handling of the apparatus when placing and locating the head in the water to initiate its use.

Another embodiment of the apparatus comprises at least the holding edge and other components of the aforementioned embodiments, and further comprises a rearward removal edge for cutting or uprooting the aquatic vegetation when the head is moved in a rearward direction. The head again preferably comprises a bracket having a plate connected to its underside. However, the head further comprises a secondary plate connected to an underside of above-recited plate. The secondary plate of the head defines a substantially flat lower surface between a forward removal edge and the rearward removal edge. The forward removal edge thus again cuts or uproots the aquatic vegetation when the head is moved in a forward direction while the rearward removal edge cuts or uproots the vegetation when the head is moved in a rearward direction. Although not as effective as the holding edge of the other above-recited embodiments, the rearward removal edge, when the head is moved in a rearward direction, also comprises the holding edge to hold the vegetation cut or uprooted by the rearward removal edge during this same movement, as well as that vegetation cut or uprooted by the forward removal edge during the head's movement in the forward direction.

The plate of this embodiment defines both forward and rearward serrated edges located slightly inward of the respective forward and rearward removal edge. Each serrated edge preferably comprises a plurality of rectangular serrations displaced from one another by a predetermined distance. The plate and rectangular serrations provide rigidity to the underlying secondary plate, with the serrations also providing a safety function for the secondary plate's forward and rearward removal edges.

DESCRIPTION OF THE EMBODIMENTS

This invention relates generally to the removal of aquatic vegetation from bodies of water. More specifically, the invention relates to an apparatus and method for the removal of such vegetation, the apparatus and method facilitating a cutting or uprooting of the vegetation within the water and the optional collection of it there-from.

Figure 1:
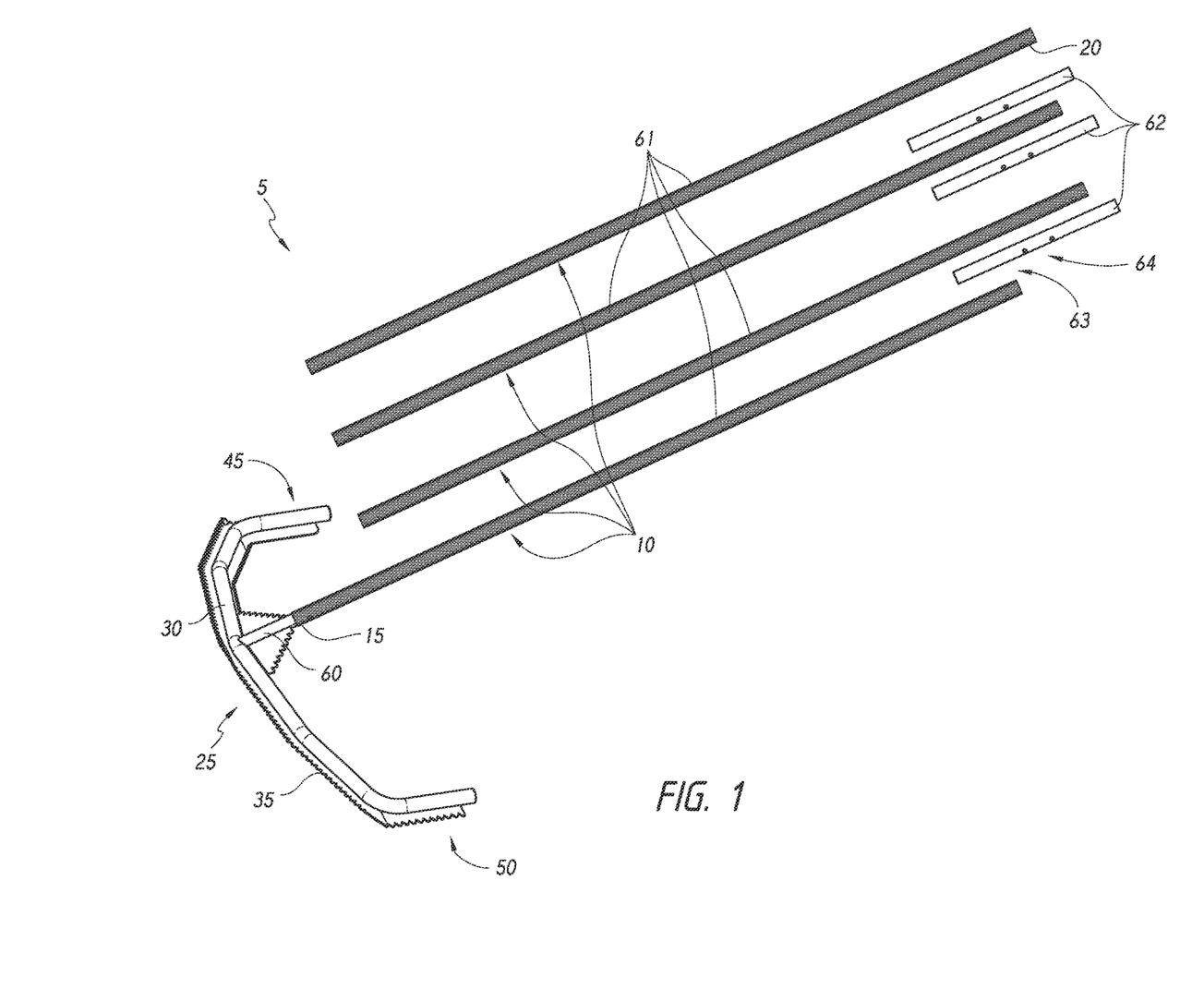
FIG. 1 a perspective view of one embodiment of the claimed apparatus.
Figure 2:
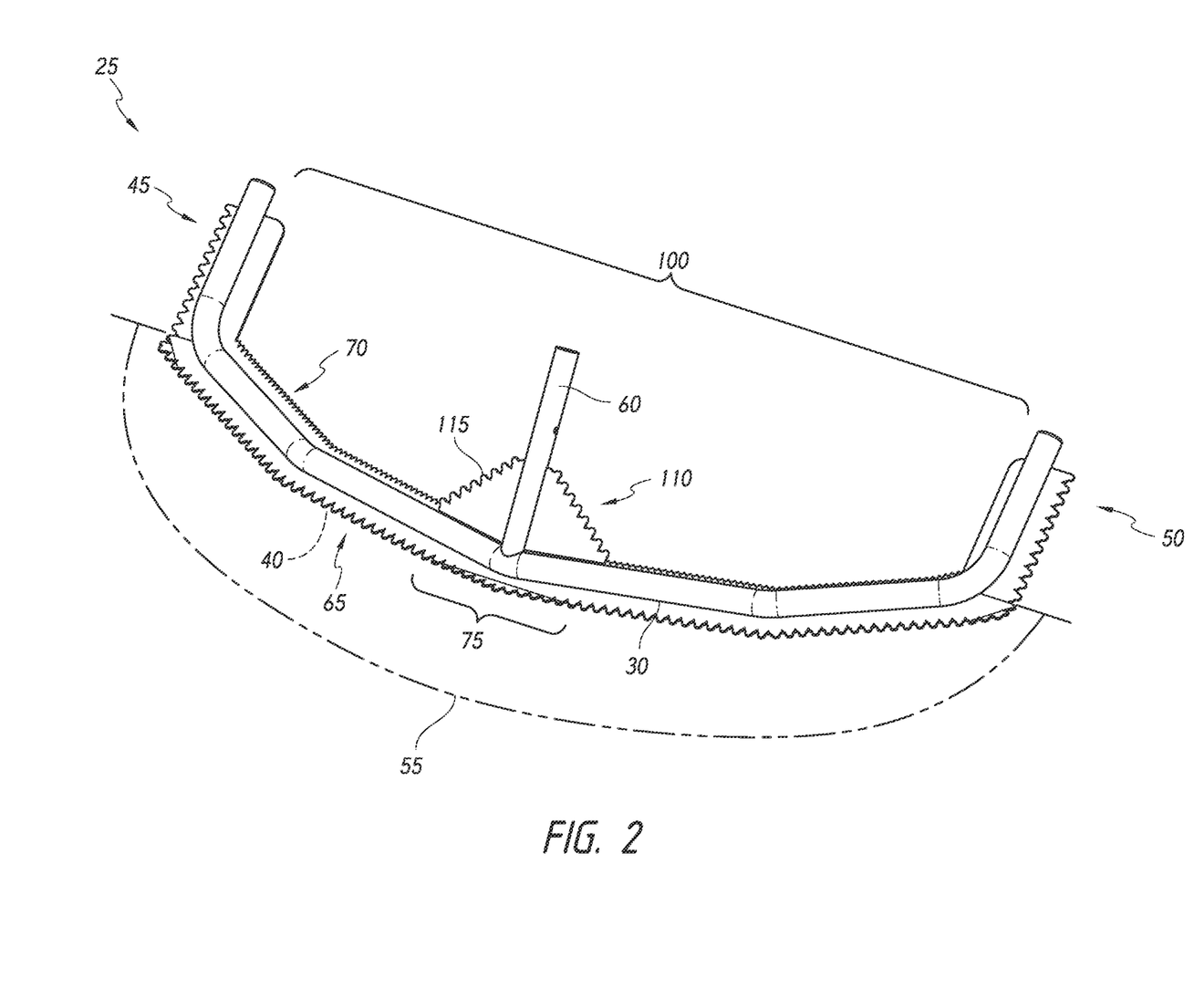
FIG. 2 is a perspective view of the head of the apparatus illustrated in FIG. 1.
Figure 3:
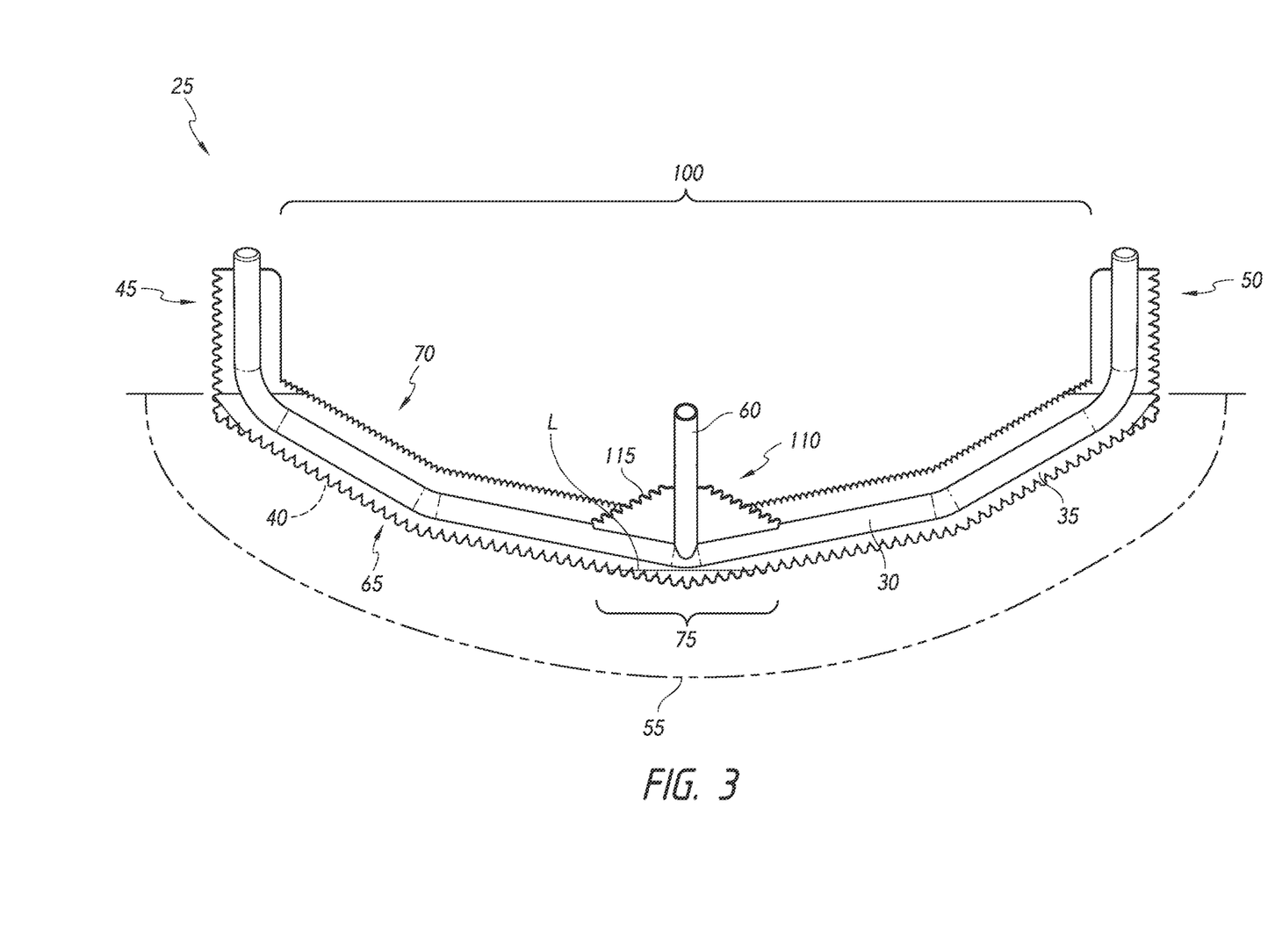
FIG. 3 is a plan view of the head of the apparatus illustrated in FIG. 1.

FIG. 1 illustrates a first embodiment of the apparatus 5. As illustrated in FIG. 1, the apparatus 5 comprises an elongated handle 10 defining forward and rearward ends 15 and 20. A width-wise head 25 is connected about transversely to the handle 10 at the handle's forward end 15. In the embodiment of FIG. 1, the head 25 preferably comprises a bracket 30 having a plate 35 connected to its underside, with the plate preferably defining a flat lower surface 40, to be further discussed. In a preferred embodiment, the bracket 30 and plate 35 are preferably comprised of zinc coated steel while the elongated handle 10 is preferably comprised of tube-form aluminum. However, it is understood that the plate 35, bracket 30 and handle 10 may be comprised of any material understood in the art as resisting corrosion, to include stainless or galvanized steel, as well as plastics and polymers. The bracket 30 and plate 35 are preferably connected to one another via one or more welds. However, it is understood that the components may be connected to one another via a plurality of fasteners, such as rivets, screws, nut and bolt combinations, or via adhesive bond. It is further understood that the components may be unitary with one another as well.

Referring again to FIG. 1, the head 25 defines outer ends 45 and 50 and a middle portion 55. The forward end 15 of the handle 10 is connected centrally to the middle portion 55 of the head 25 via a head segment 60 defined by the bracket 30. The elongated handle 10 is preferably removably connected to the head 25 via the head segment 60 and is length adjustable via an assembly of a plurality of handle segments 61 and linking segments 62. The handle segments 61 connect to both the head segment 60 and linking segments 62 via a male-female fitment 63 understood in the art, and are removably secured to one another preferably via a snap-button-and-orifice fitment 64, also as understood in the art.

FIGS. 2, 3, 4 and 5 illustrate perspective, plan, and front and side elevation views, respectively, of the head 25 of FIG. 1. As illustrated therein, the plate 35 of the head 25 defines a substantially flat lower surface 40 defined between a removal edge 65 and at least a holding edge 70. The removal edge 65 cuts or uproots the aquatic vegetation when the head 25 is moved in a forward direction while the holding edge 70 at least holds the aquatic vegetation, cut or uprooted by the removal edge 65, when the head 25 is moved in a rearward direction.

Figure 4:
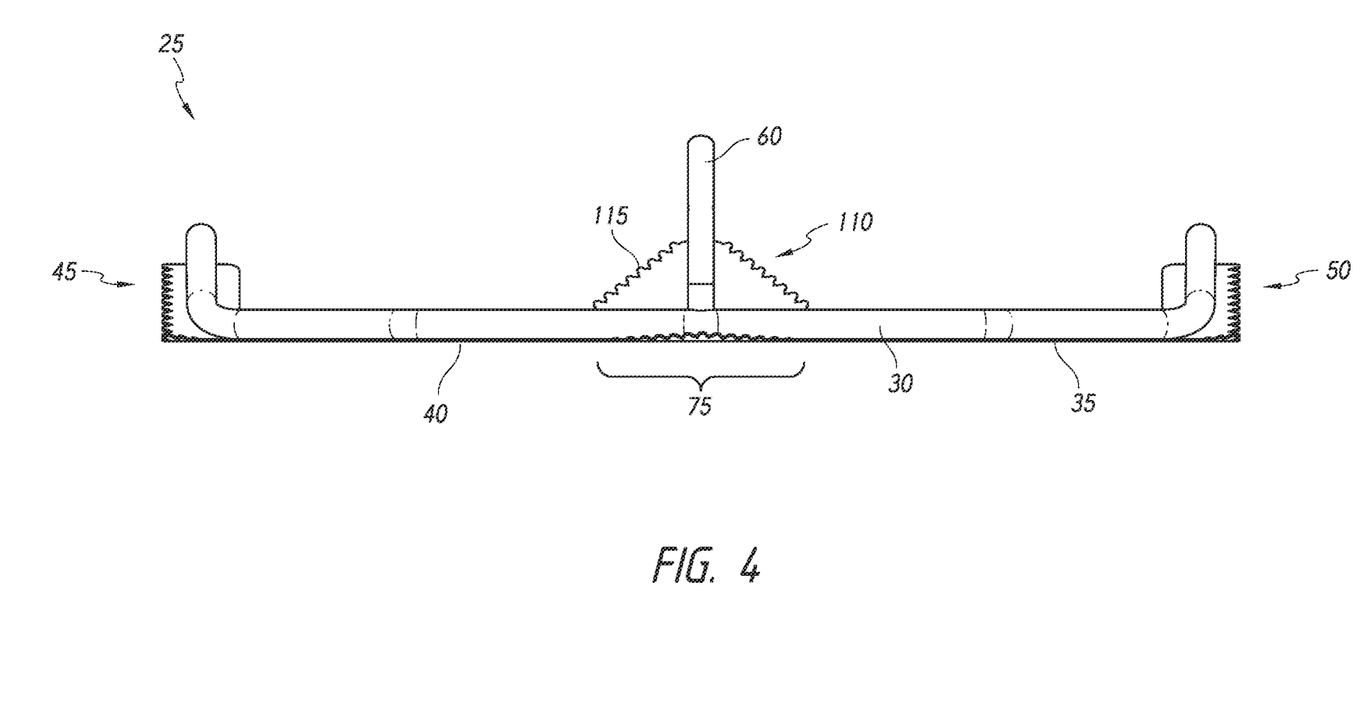
FIG. 4 is a front elevation view of the head of the apparatus illustrated in FIG. 1.
Figure 5:
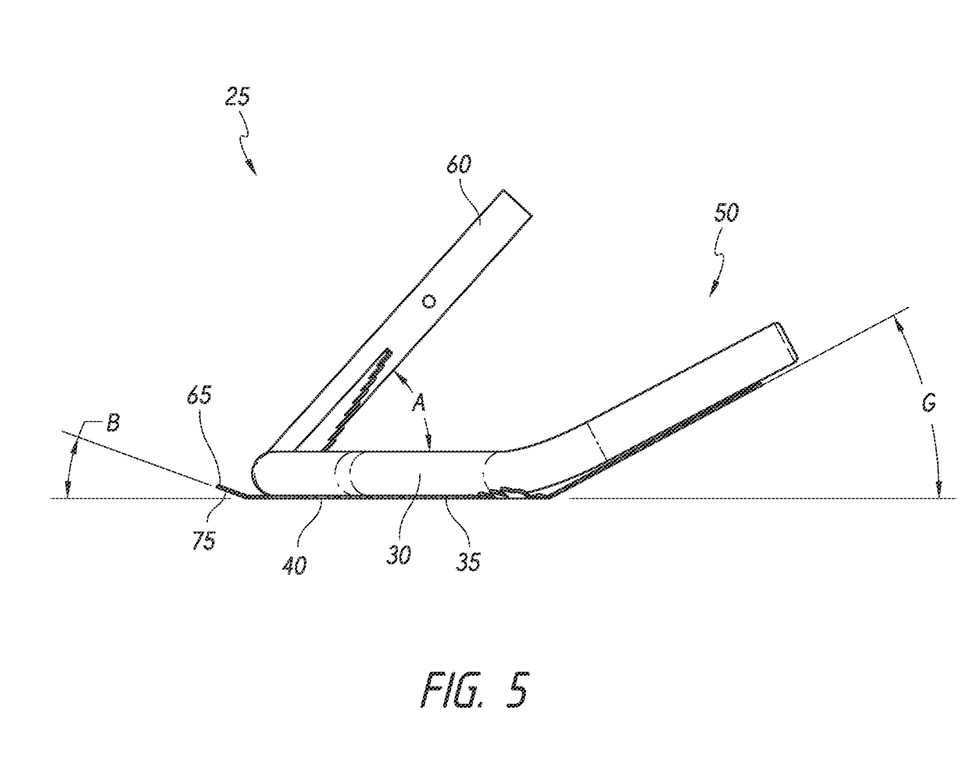
FIG. 5 is a side elevation view of the head of the apparatus illustrated in FIG. 1.

As illustrated in FIGS. 4 and 5, the lower surface 40 of the plate 35 is oriented at a predetermined angle A from the elongated handle 10 via an angle of the head segment 60 defined in relation to the head's lower surface 40. This angle A allows the plate's lower surface 40 of the head 25 to remain flush against a lake, pond or river bottom while the handle 10 is gripped above the water by a user. The predetermined angle A of the head's lower surface from the handle is between about 0 degrees and about 60 degrees, more preferably between about 10 degrees and about 50 degrees, and optimally about 48 degrees.

In a preferred embodiment, the removal edge 65 defines an upwardly-directed angular offset segment 75 located centrally within the head's middle portion 55 for preventing an interference of the edge with water body's bottom surface when the head 25 is moved in a forward direction. More specifically, the offset segment 75 is angled upwardly from the lower surface 40 by predetermined angle B to prevent the removal edge 65 from digging into the sand or silt of the lake, pond or river bottom when the head 25 is moved in a forward direction. The predetermined angle B of the offset segment 75 from the head's lower surface 40 is between about 0 degrees and about 30 degrees, more preferably between about 15 degrees and about 25 degrees, and optimally about 20 degrees. While the preferred embodiment defined the upwardly-directed angle offset of the removal edge 65 as a segment 75, it is understood that the entire removal edge 65 may be define the upwardly-directed angular offset as well.

Figure 6:
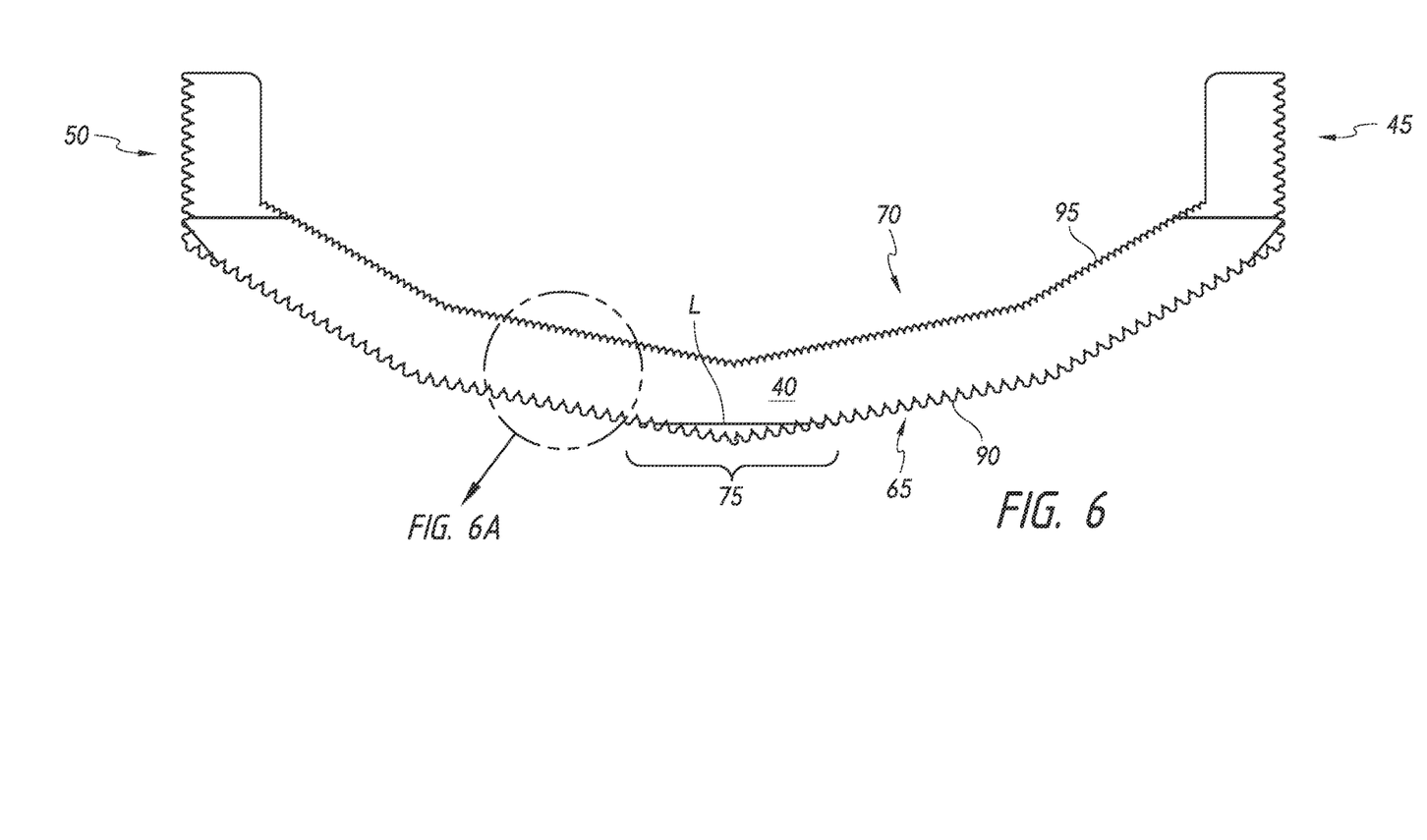
FIG. 6 is a plan view illustrating the serrations of the plate of FIG. 3.
Figure 6A:
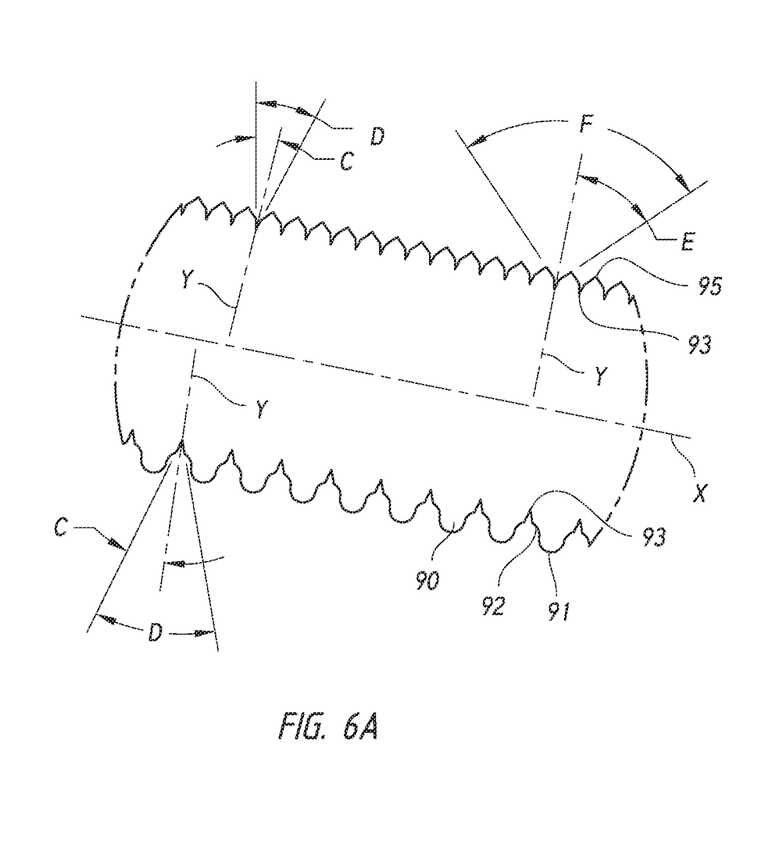
FIG. 6A is a detail view of the serrations of FIG. 6.

FIG. 6A illustrates a detail of a portion of the head's lower surface 40. As illustrated in FIG. 6A, the portion defines an imaginary axis X parallel to the removal and holding edges 65 and 70, with the removal edge 65 preferably comprising a plurality of rounded serrations 90 and the holding edge 70 preferably comprising a plurality of pointed serrations 95. The rounded serrations 90 preferably define a plurality of alternating forwardly and rearwardly directed half-circles 91 and 92 oriented in substantial opposition to one another, with the rearwardly directed half-circles 92 each centrally defining an inwardly directed void 93.

In a preferred embodiment, each inwardly directed void 93 is defined by a predetermined angle C from an imaginary Axis Y oriented perpendicular to the axis X. The predetermined angle C from Axis Y is between about 1 degrees and about 15 degrees, more preferably between about 2.5 degrees and about 7.5 degrees, and optimally about 5 degrees to define total Angle D of the void 93 (i.e., the total angle bisected by Axis Y) of between about 1 degree and about 30 degrees, more preferably between about 5 degrees and about 15 degrees, and optimally about 10 degrees.

When the head 25 moves in a forward direction, the alternating forwardly and rearwardly directed half-circles 91 and 92 "funnel" or direct one or more plants of the aquatic vegetation to the voids 93, which in turn sever or uproot such one or more plants. Although the rounded serrations 90 preferably define forwardly and rearwardly directed half circles 91 and 92 and the voids 93 preferably defines a predetermined angle from axis Y, it is understood that the rounded serrations may define forwardly and rearwardly directed ovals or ellipses while the voids may define inwardly directed squares or rectangles having sides parallel to the axis Y as well.

Referring again to the detail of FIG. 6A, each pointed serration 95 of the holding edge 70 is defined by a predetermined angle E from an imaginary axis Y oriented perpendicular to the axis X. The predetermined angle E from axis Y is between about 1 degree and about 60 degrees, more preferably between about 5 degrees and about 50 degrees, and optimally about 40 degrees to define total angle F of the serration 95 (i.e. total angle bisected by axis Y) of between about 1 degree and about 120 degrees, more preferably between about 10 degrees and about 100 degrees, and optimally about 80 degrees.

Each pointed serration 95 of the holding edge 70 preferably also defines the inwardly directed void 93 therebetween. Each inwardly directed void 93 is again defined by a predetermined angle C from an imaginary axis Y oriented perpendicular to the axis X. The predetermined angle C from axis Y is between about 1 degrees and about 15 degrees, more preferably between about 2.5 degrees and about 7.5 degrees, and optimally about 5 degrees to again define total angle D of the void 93 (i.e., total angle bisected by Axis Y) of between about 1 degree and about 30 degrees, more preferably between about 5 degrees and about 15 degrees, and optimally about 10 degrees. When the head 25 moves in a rearward direction, the pointed serrations 95 collect the one or more plants cut or uprooted by the head's removal edge 65. Although not as effective as those voids 93 defined in the removal edge 65, the inwardly directed rearward voids of the holding edge 70 can also cut and uproot vegetation when the head 25 is moved in a rearward direction. Again, although the voids 93 of the holding edge 70 are preferably defined by a predetermined angle from axis Y, it is understood that the voids may define inwardly directed squares or rectangles having sides parallel to the axis Y as well.

Referring again to FIGS. 2, 3, 4 and 5, the outer ends 45 and 50 of the head 25 are preferably located rearward of the head's middle portion 55. This configuration thus defines a collection area 100 of the head 25 between the outer ends 45 and 50. The collection area 100 of the head 25, when moved in a rearward direction, gathers and collects the vegetation cut or uprooted by the removal edge 65 during the head's movement in the forward direction. In a preferred embodiment illustrated within the figures, the rearward configuration of the head's outer ends defines an approximate "boomerang" shape of the head 25, to include its plate 35 and bracket 30, to define the collection area 100. Although the figures illustrate a "boomerang shape, it is understood that the rearward configuration of the head's outer ends 45 and 50 could define other head shapes as well to define the head's collection area 100, to include arcuate or "C" shapes, open-ended triangular or "arrowhead" shapes, open-ended square or rectangular shapes, or any other open-ended polygonal or geometric shape understood in the art as defining the a collection area for the head.

The outer ends 45 and 50 of the head 25 are also angled upwardly of the head's lower flat surface 40 by angle G for preventing an interference of the outer ends with the bottom of a water body when the head is moved in a rearward direction. More specifically, the upwardly angle G of the outer ends 45 and 50 prevents the ends from "digging into" the sand or silt of a lake, pond or river bottom when the head 25 is moved in a rearward direction. The upwardly angle G of the outer ends 45 and 50 from the head's lower surface 40 is between about 0 degrees and about 45 degrees, more preferably between about 15 degrees and about 30 degrees, and optimally about 28 degrees.

In another embodiment of the invention, the head 25 possesses a buoyant property for countering a sinking motion of the head within the water. The buoyant property thus facilitates an easier handling of the apparatus 5 when placing and locating the head 25 in the water to initiate a use of the apparatus. More specifically, given the extended length of the handle 10 existing between a user of the apparatus 5 and the apparatus' head 25, the buoyant property of the head counteracts any burdensome torque imparted by the head to the handle due to the weight of the head sinking within the water. In one embodiment, the buoyant property of the head 25 is created by filling the head's bracket 30 with a foam material. In a preferred embodiment, the buoyant property is created by sealing off the end openings 105 of the bracket's outer ends 45 and 50 and head segment 60, thus trapping air within the bracket itself.

To strengthen the angular rigidity existing between the head 25 and handle 10, a further embodiment of the apparatus comprises at least one gusset 110 connected between the handle and the head's middle portion 55. As illustrated in FIGS. 2, 3, 4 and 5, a pair of gussets 110 is affixed in opposing relation to one another between the head's bracket 30 and head segment 60. The gussets 110 thus increase the structural rigidity exiting between the bracket 30 and head segment 60, and ultimately between the apparatus' head 25 and handle 10. In a preferred embodiment of the invention, the non-affixed edge 115 of the at least one gusset 110 of FIGS. 2, 3, 4 and 5 defines a plurality of rounded serrations 90. However, it is understood that the at least one gusset 110 can define a plurality of pointed serrations 95, as well as no serrations whatsoever. It is further understood that although the at least one gusset 110 is illustrated within the figures as a pair of gussets, a single gusset may be utilized as well between the head's bracket 30 and head segment 60.

FIGS. 7-12 illustrate an additional embodiment of the apparatus 5 comprising at least the holding edge 70 and other components illustrated in FIGS. 1-6. However, the head 25 of the embodiment of FIGS. 7-12 further comprises a rearward removal edge 120, to be further discussed, for cutting or uprooting the aquatic vegetation when the head is moved in a rearward direction. As illustrated in FIGS. 7-12, head 25 again preferably comprises a bracket 30 having a plate 35 connected to its underside. However, the head 25 further comprises a secondary plate 125 connected to an underside of plate 35. In a preferred embodiment, the bracket 30 and plate 35 are preferably again comprised of zinc coated steel while the secondary plate 125 is preferably comprised of stainless steel. However, it is understood that the secondary plate 125, plate 35, bracket 30 may be comprised of any material understood in the art as resisting corrosion, to include aluminum, galvanized steel, plastics and polymers. The bracket 30 and plate 35 are again preferably connected to one another via one or more welds while the secondary plate 125 is connected to the underside of plate 35 via a plurality of rivets 127. However, these components may be connected to one another via any fastening means understood in the art, to include a plurality of other fasteners, such as screws or nut and bolt combinations, or via adhesive bond. It is further understood that the components may be unitary with one another as well.

Figure 7:
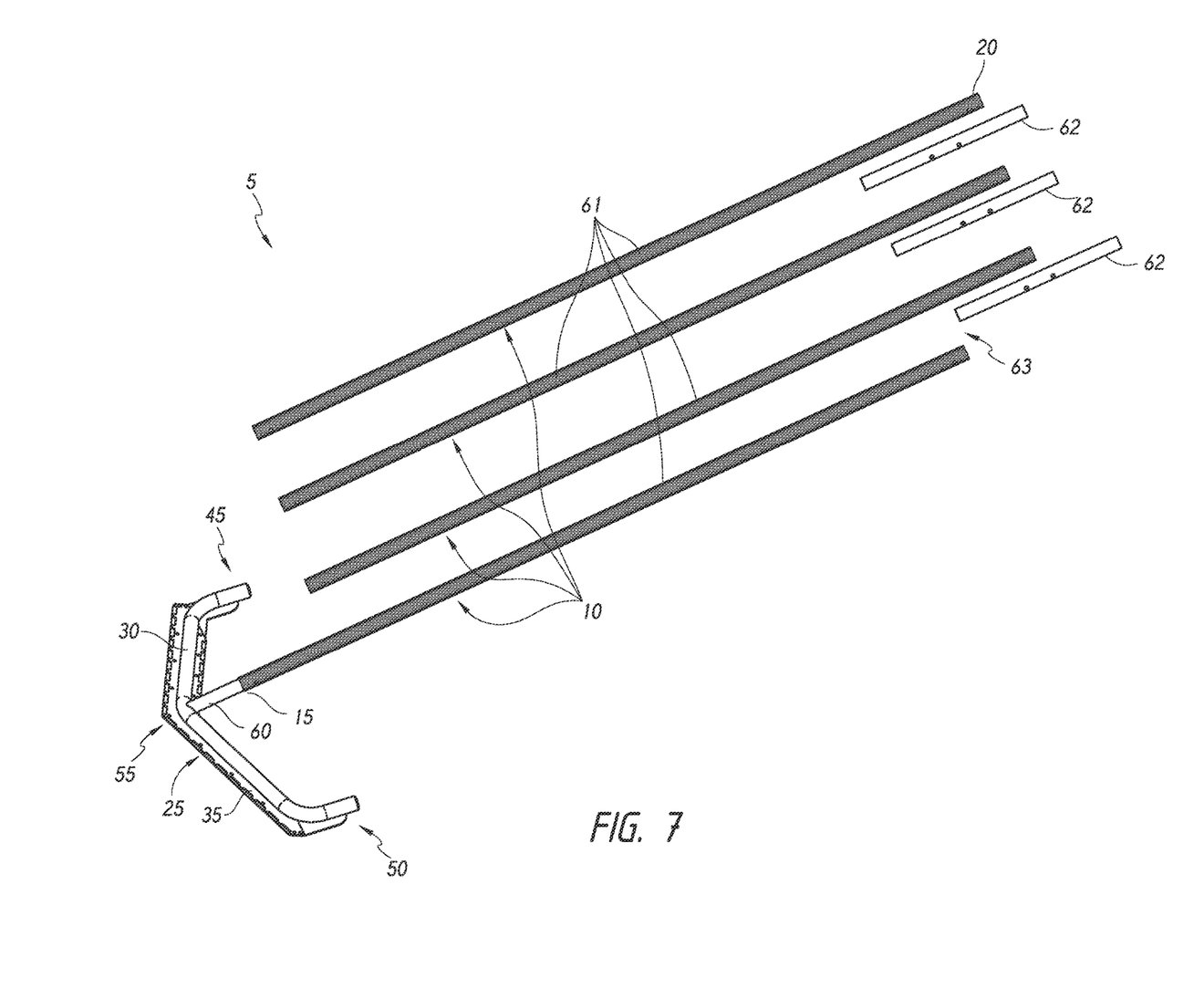
FIG. 7 a perspective view of another embodiment of the claimed apparatus.
Figure 8:
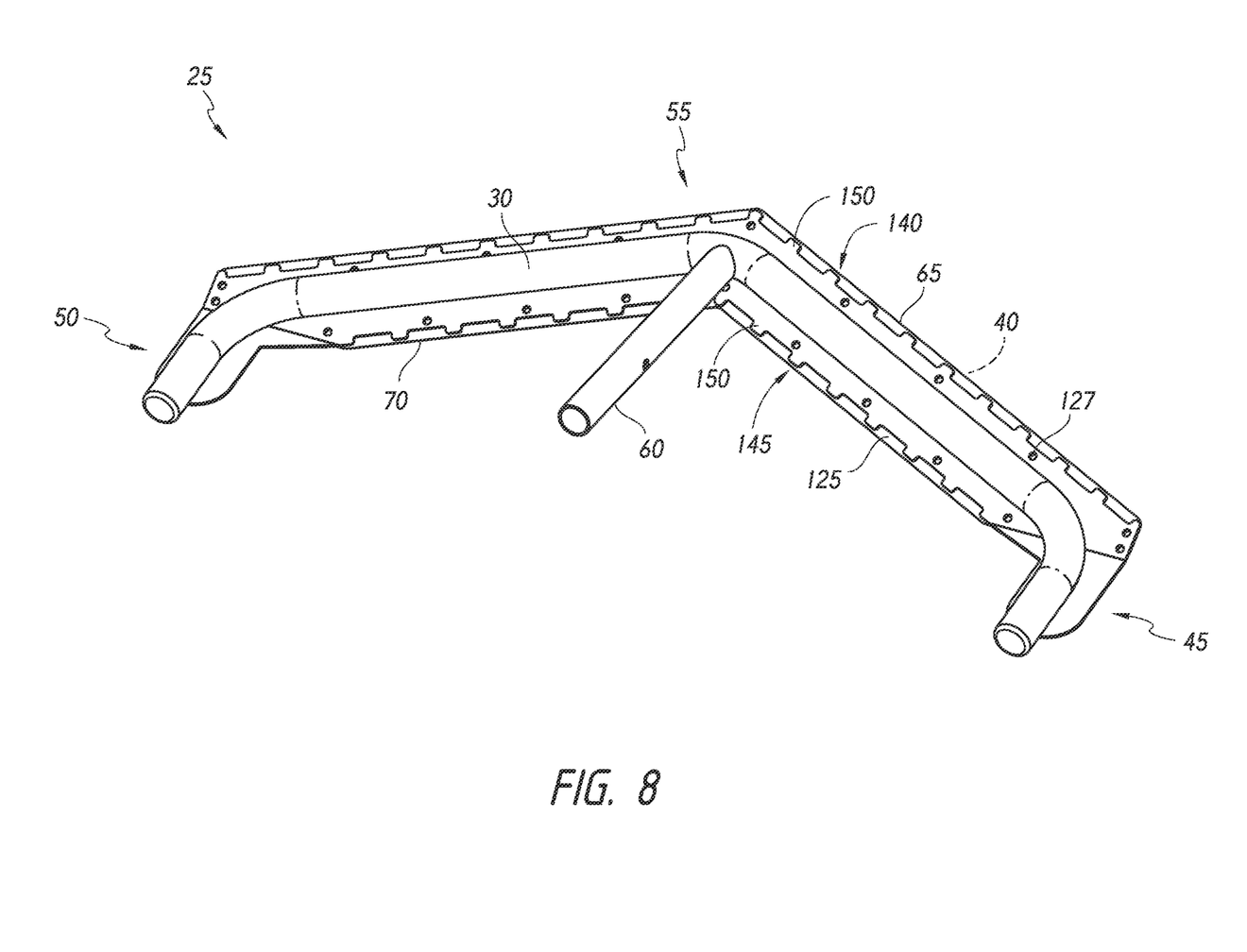
FIG. 8 is a perspective view of the head of the apparatus illustrated in FIG. 7.
Figure 9:
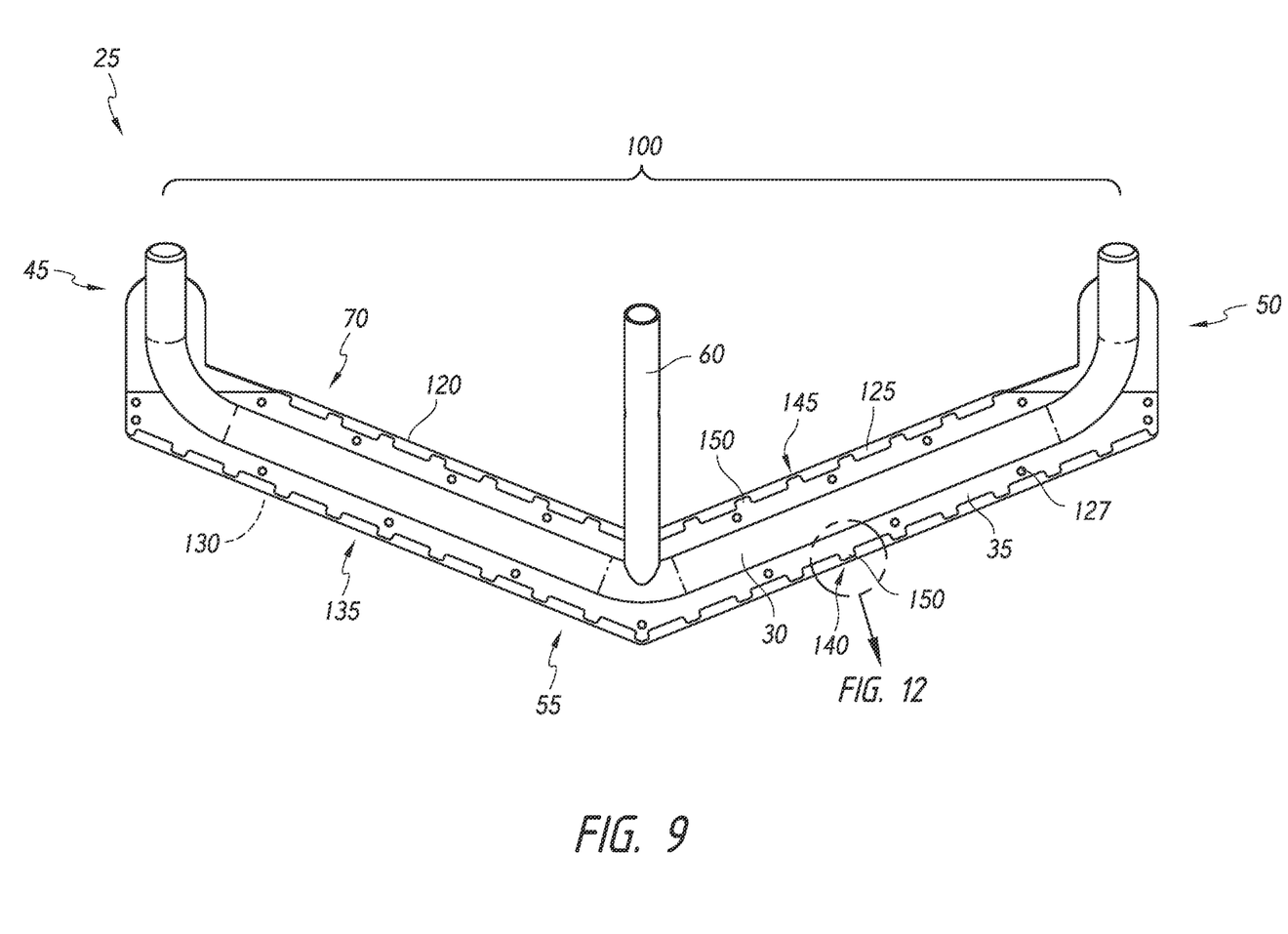
FIG. 9 is a plan view of the head of the apparatus illustrated in FIG. 7.
Figure 10:
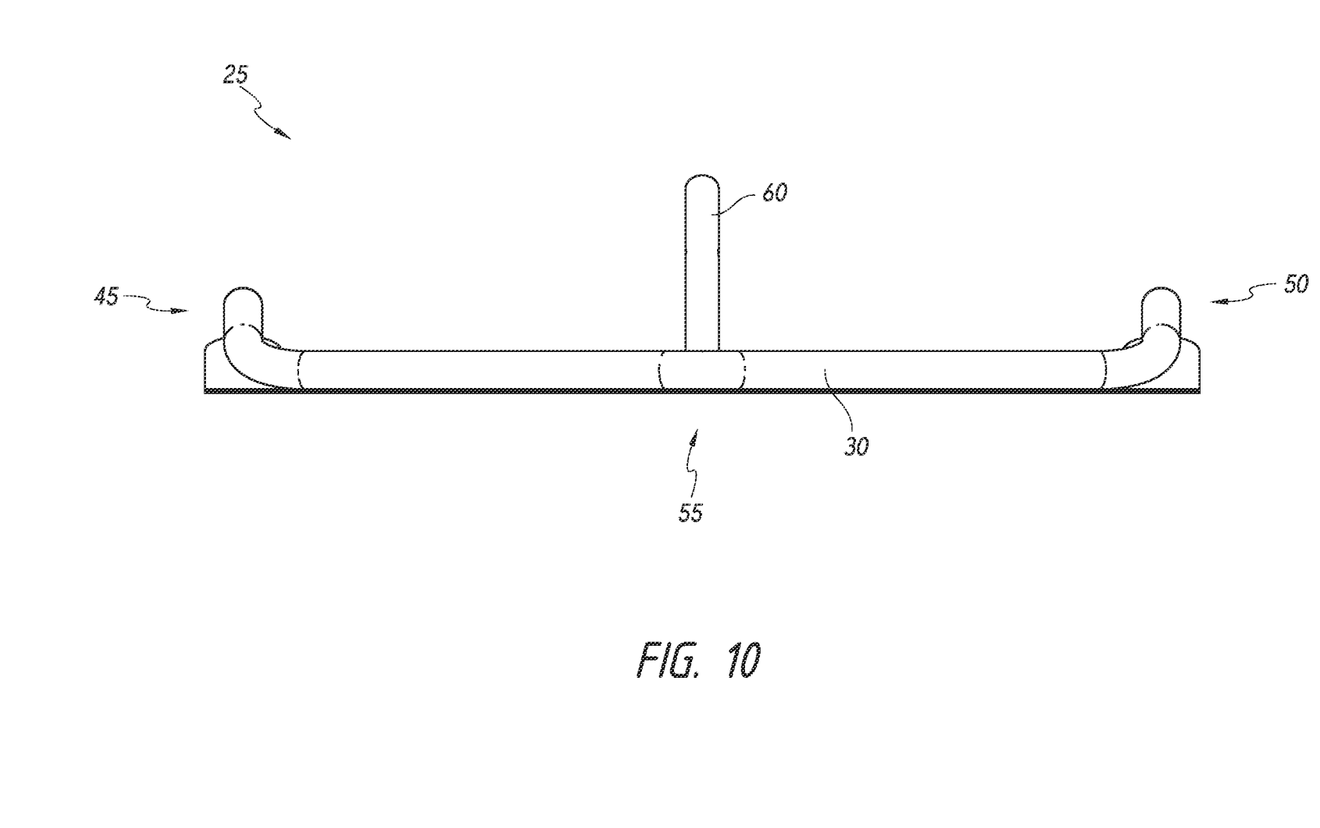
FIG. 10 is a front elevation view of the head of the apparatus illustrated in FIG. 7.
Figure 11:
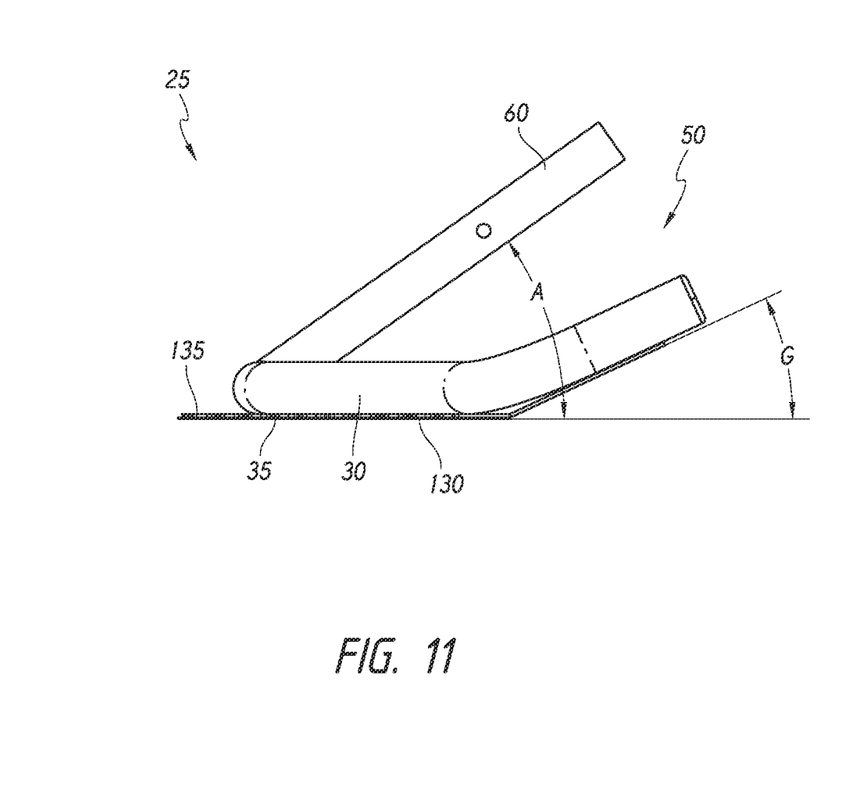
FIG. 11 is a side elevation view of the head of the apparatus illustrated in FIG. 7.

FIGS. 8, 9, 10 and 11 illustrate perspective, plan, and front and side elevation views, respectively, of the head 25 of FIG. 7. As illustrated therein, the secondary plate 125 of the head 25 defines a substantially flat lower surface 130 between a forward removal edge 135 and the rearward removal edge 120. The forward removal edge 135 thus again cuts or uproots the aquatic vegetation when the head 25 is moved in a forward direction while the rearward removal edge 120 cuts or uproots the vegetation when the head is moved in a rearward direction. Although not as effective as the holding edge 70 of the embodiment of FIGS. 1-6, the rearward removal edge 120, when the head 25 is moved in a rearward direction, also comprises the holding edge 70 to hold the vegetation cut or uprooted by the rearward removal edge during this same movement, as well as that vegetation cut or uprooted by the forward removal edge 135 during the head's movement in the forward direction.

Figure 12:
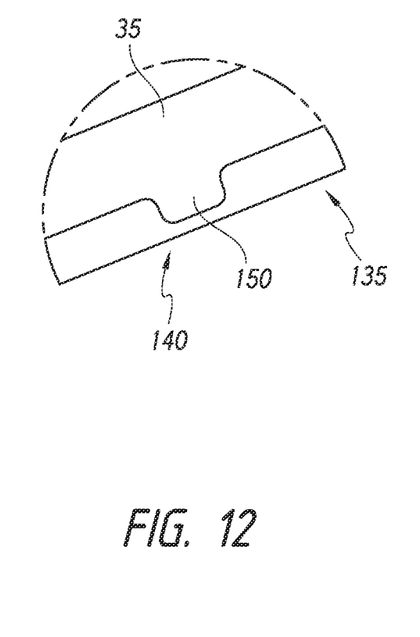
FIG. 12 is a detail view illustrating the serrations of the plate of FIG. 9.

Referring again to FIGS. 7-11, the plate 35 defines both forward and rearward serrated edges 140 and 145 located slightly inward of the respective forward and rearward removal edges 135 and 120. FIG. 12 illustrates a detail of a plan view of the head's forward and rearward serrated edges 140 and 145. As illustrated therein, the edges 140 and 145 each preferably comprises a plurality of outwardly directed rectangular serrations 150 displaced from one another. The plate 35 and rectangular serrations 150 provide rigidity to the underlying secondary plate 125, with the serrations also providing a safety function for the secondary plate's forward and rearward removal edges 135 and 120. More specifically, each rectangular serration 150, located slightly inwardly of the respective removal edges 135 and 120, act as "bump-stops" to prevent penetration of the edges into a user of the apparatus 5 if such a user was to bump a body part against one of the edges.

Similar to the embodiment of FIGS. 1-6, the embodiment of FIGS. 7-12 have a lower surface 40 of the plate 35 at a predetermined angle from the elongated handle 10 via an angle of the head segment 60 defined in relation to the head's lower surface. Again this angle allows the plate's lower surface 40 of the head to remain flat against a lake, pond or river bottom while the handle is gripped above the water by a user. The predetermined angle of orientation of the head's lower surface from the handle is between about 0 degrees and about 60 degrees, more preferably between about 10 degrees and about 50 degrees, and optimally about 35 degrees.

The embodiment of FIGS. 7-12 also have outer ends 45 and 50 of the head 25 angled upwardly of the head's lower flat surface 40 for preventing an interference of the outer ends with the bottom of a water body when the head is moved in a rearward direction. Again, the upwardly angle of the outer ends 45 and 50 prevents the ends from "digging into" the sand or silt of a lake, pond or river bottom when the head 25 is moved in a rearward direction. The upwardly angle of the outer ends 45 and 50 from the head's lower surface 40 is between about 0 degrees and about 45 degrees, more preferably between about 15 degrees and about 30 degrees, and optimally about 25 degrees.

While the embodiment of FIGS. 7-12 do not define an upwardly-directed angular offset segment 75 within the forward edge 65 for preventing an interference of the head's forward edge with the bottom surface defined by the body of water when the head 25 is moved in a forward direction, it is understood that such an offset segment may nonetheless be defined by this embodiment as disclosed herein for the embodiment of FIGS. 1-6.

In another embodiment of the invention, the head 25 possesses a buoyant property for countering a sinking motion of the head within the water. The buoyant property thus facilitates an easier handling of the apparatus 5 when placing and locating the head 25 in the water to initiate a use of the apparatus. More specifically, given the extended length of the handle 10 existing between a user of the apparatus 5 and the apparatus' head 25, the buoyant property of the head counteracts any burdensome torque imparted by the head to the handle due to the weight of the head sinking within the water. In one embodiment, the buoyant property of the head 25 is created by filling the head's bracket 30 with a foam material. In a preferred embodiment, the buoyant property is created by sealing off the end openings 105 of the bracket's outer ends 45 and 50 and head segment 60, thus trapping air within the bracket itself.

In a use in the embodiments of FIGS. 1-6, a user grips the extended handle of the apparatus, places the head of apparatus' head onto the surface of the water of a water body and allows the head to sink into the water. The user thereafter moves the head in a forward direction such that the head's removal edge cuts and/or uproots the aquatic vegetation, and then moves the head in a rearward direction such that the head's holding edge at least holds the cut and/or uprooted vegetation within the head's collection area. During the head's movement in the rearward direction, the head holding edge may also cut and/or uproot the aquatic vegetation, with such cut or uprooted vegetation held within the head's collection area. The user thereafter further moves the head in a rearward direction to bring the head proximal to the user, where the user thereafter strips the vegetation from the head of the apparatus.

During an initiation of the foregoing use, the user may optionally place the head on the surface of the water and move it in a forward direction such that the head's lower surface skims the surface to a desired location on the water, prior to allowing the head to sink into the water. Also, during the sinking of the head within the water, the rate and level of the head's descent is controlled by the head's buoyant property. Furthermore, during the forward and rearward movements of the head within the water, the head's bottom surface may rest upon the bottom of the water body, with the angles of the handle, offset forward edge segment and/or head's outer ends preventing the head from digging into the water body's bottom.

In a use of the of the embodiment of FIGS. 7-12, a user grips the extended handle of the apparatus, places the head of apparatus' head onto the surface of the water of a water body and allows the head to sink into the water. The user thereafter moves the head in a forward direction such that the head's forward removal edge cuts and/or uproots the aquatic vegetation, and then moves the head in a rearward direction such that the head's rearward removal edge also cuts and/or uproots the vegetation. During the head's movement in the rearward direction, the head's rearward removal edge may also hold the cut and/or uprooted vegetation within the head's collection area. The user thereafter optionally further moves the head in a rearward direction to bring the head proximal to the user, where the user thereafter strips the any cut and/or vegetation collected within the head's collection area from the head of the apparatus.

During an initiation of the foregoing use, the user may optionally place the head on the surface of the water and move it in a forward direction such that the head's lower surface skims the surface to a desired location on the water, prior to allowing the head to sink into the water. Also, during the sinking of the head within the water, the rate and level of the head's descent is controlled by the head's buoyant property. Furthermore, during the forward and rearward movements of the head within the water, the head's bottom surface may rest upon the bottom of the water body, with the angles of the handle, offset forward edge segment and/or head's outer ends preventing the head from digging into the water body's bottom.

While the foregoing description and accompanying figures are illustrative of the present invention, other variations in structure and method are possible without departing from the invention's spirit and scope.

I claim:

1. An apparatus for removing aquatic vegetation from a body of water comprising:
    an elongated handle defining forward and rearward ends;
    a head connected transversely to the elongated handle at the forward end, the head defining outer ends and a middle portion, the head further defining a substantially flat lower surface between a forward removal edge of the head and at least a rearward holding edge of the head, the substantially flat lower surface oriented at a predetermined angle from the elongated handle, the outer ends of the head located rearwardly of the middle portion to define a collection area, said outer ends angled upwardly of the substantially flat lower surface.

2. The apparatus of claim 1 wherein the head comprises a bracket and a plate connected to an underside of the bracket, the plate defining the flat lower surface, the forward removal edge and the rearward holding edge.

3. The apparatus of claim 2 wherein the plate defines an upwardly-directed angular offset segment centrally located within the middle portion of the head.

4. The apparatus of claim 1 wherein the forward removal edge and the rearward holding edge each define a plurality of serrations.

5. The apparatus of claim 4 wherein the serrations of the forward removal edge are rounded and the serrations of the rearward holding edge are pointed.

6. The apparatus of claim 5 wherein the rounded serrations define forwardly and rearwardly directed half circles oriented in substantial opposition to each other, the rearwardly directed half circles each centrally defining an inwardly directed void, said inwardly directed void also defined between each pointed serration of the rearward holding edge.

7. The apparatus of claim 1 further comprising a pair of gussets connected between the head and the elongated handle, each gussets defining a serrated edge.

8. The apparatus of claim 1 wherein the head is buoyant.

9. The apparatus of claim 1 wherein the head defines a boomerang shape.

10. The apparatus of claim 1 wherein the elongated handle and the head are removably connectable with each other, the elongated handle comprising a plurality of connectable segments.

11. The apparatus of claim 1 wherein the head comprises a bracket and a plate connected to an underside of the bracket, and a secondary plate connected to an underside of the plate and defining the substantially flat lower surface, the forward removal edge and a rearward removal edge, said rearward removal edge also comprising the rearward holding edge.

12. The apparatus of claim 11 wherein the plate defines forward and rearward serrated edges located inwardly of the respective forward removal and rearward removal edges.

13. The apparatus of claim 12 wherein the serrations of the forward and rearward serrated edges of the plate are rectangular.

14. The apparatus of claim 13 wherein the secondary plate defines an upwardly-directed angular offset segment centrally located within the middle portion of the head.

15. The apparatus of claim 11 wherein the head is buoyant.

16. The apparatus of claim 11 wherein the head defines a boomerang shape.

17. The apparatus of claim 11 wherein the elongated handle and the head are removably connectable with each other, the handle comprising a plurality of connectable segments.

18. An method of removing aquatic vegetation from a body of water comprising:
    providing an apparatus comprising an elongated handle defining forward and rearward ends, a head connected transversely to the elongated handle at the forward end, the head defining outer ends and a middle portion, the head further defining a substantially flat lower surface between a forward removal edge of the head and at least a rearward holding edge of the head, the substantially flat lower surface oriented at a predetermined angle from the elongated handle, the outer ends of the head located rearwardly of the middle portion to define a collection area, said outer ends angled upwardly of the substantially flat lower surface;
    gripping the elongated handle of the apparatus;
    placing the head onto a surface of the body of water;
    allowing the head to sink into the water;
    moving the head in a forward direction to cut or uproot the vegetation;
    moving the head in a rearward direction to at least hold the cut or uprooted vegetation;
    bringing the head proximal to a user of the apparatus; and
    stripping the cut or uprooted vegetation from the head.

19. The method of claim 18 further comprising skimming the head across the surface of the body of water to a desired location prior to allowing the head to sink into the water.

* * * * *